March 1, 1966 C. N. MOSOVSKY 3,237,613
COMBINED TURBO AND INTERNAL-COMBUSTION ENGINE
Filed June 27, 1963 5 Sheets-Sheet 1
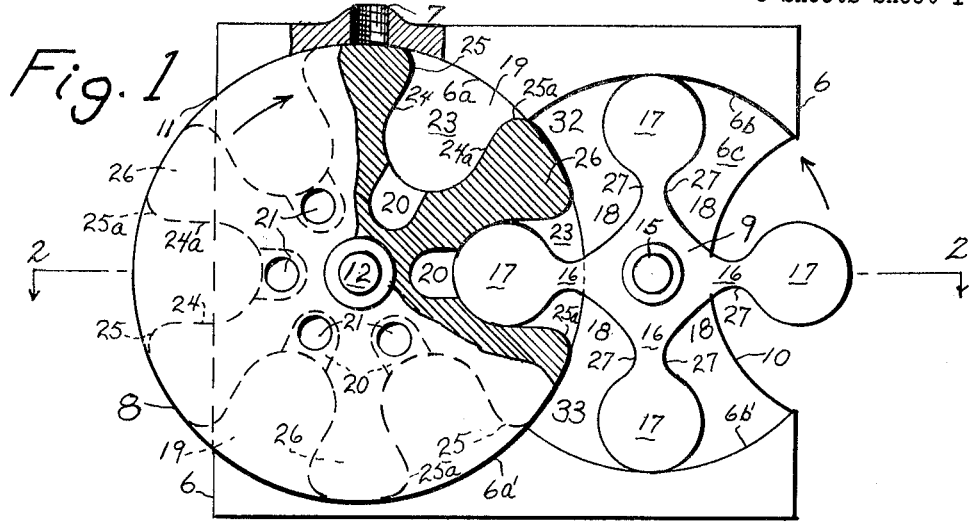
Fig. 1
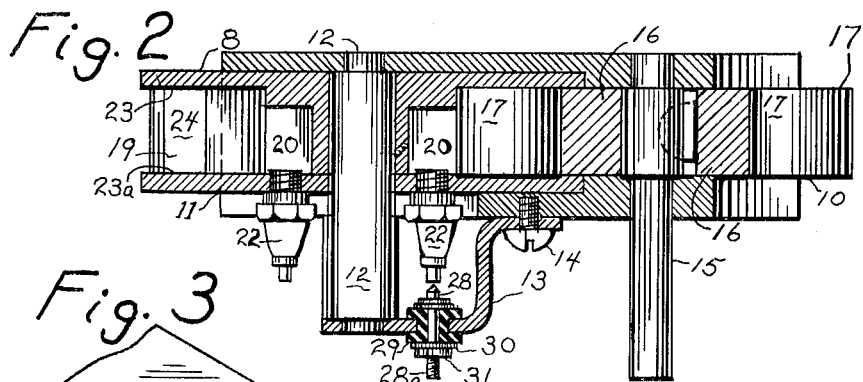
Fig. 2
Fig. 3
Fig. 4
INVENTOR.
Charles N. Mosovsky

March 1, 1966

C. N. MOSOVSKY 3,237,613

COMBINED TURBO AND INTERNAL-COMBUSTION ENGINE

Filed June 27, 1963

INVENTOR.

Charles N. Mosovsky

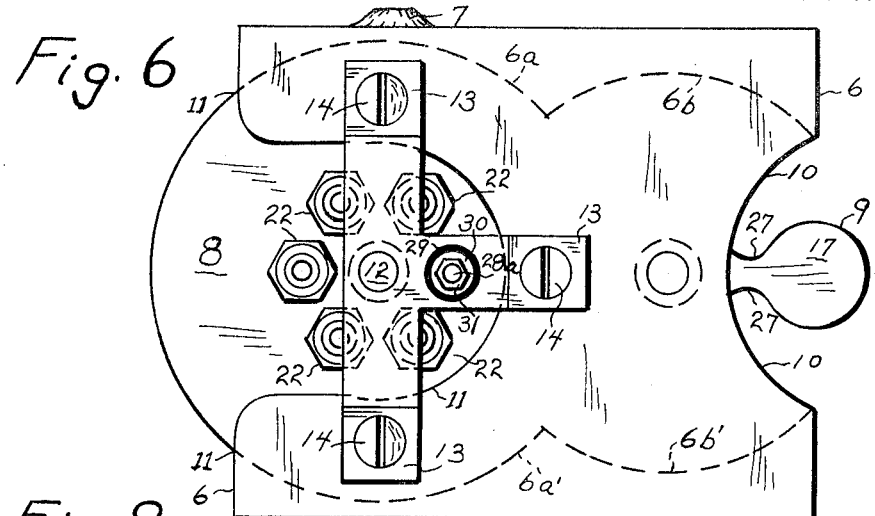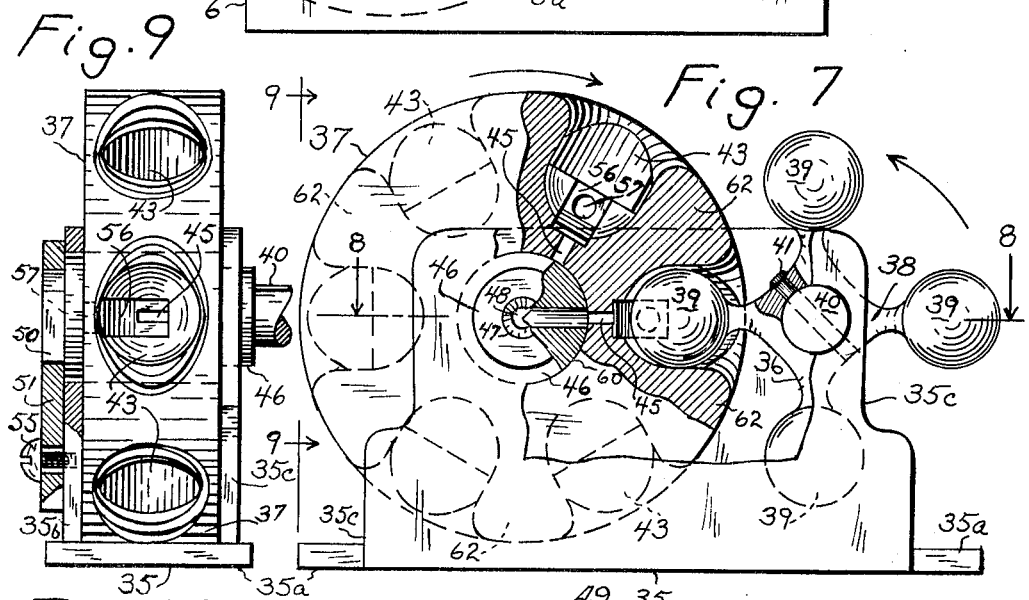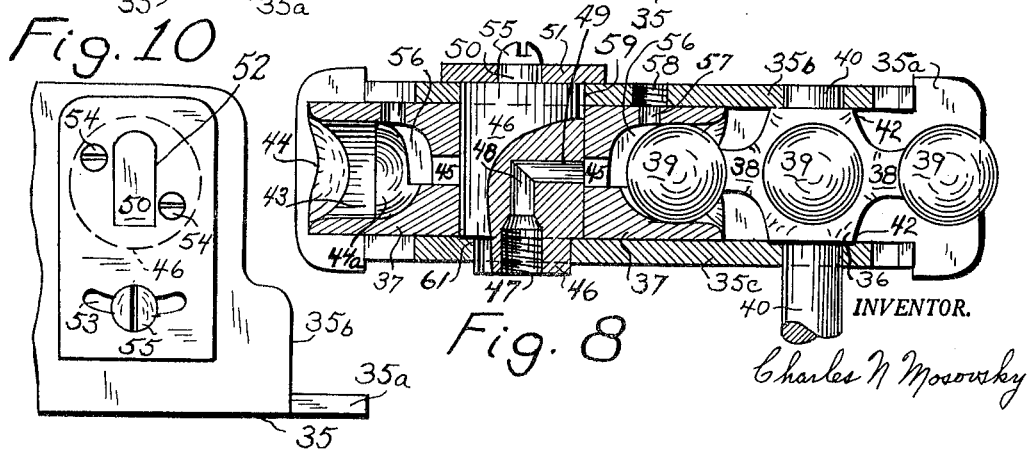

March 1, 1966  C. N. MOSOVSKY  3,237,613
COMBINED TURBO AND INTERNAL-COMBUSTION ENGINE
Filed June 27, 1963  5 Sheets-Sheet 4
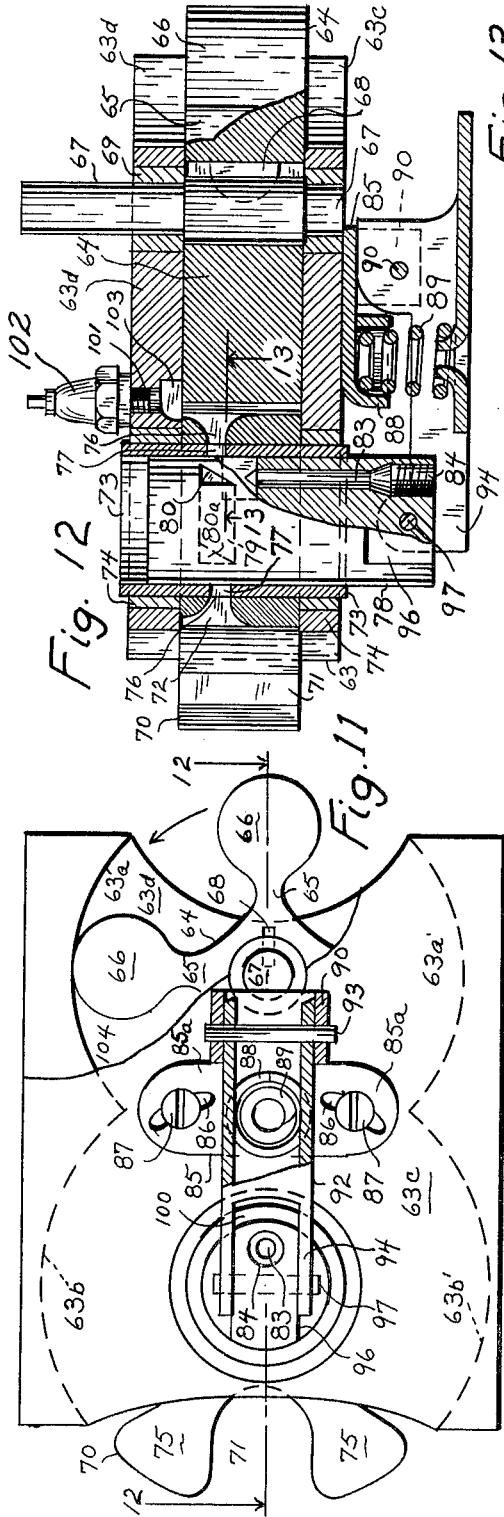
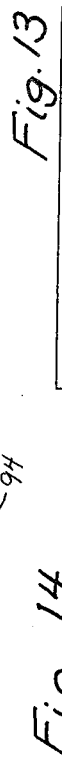
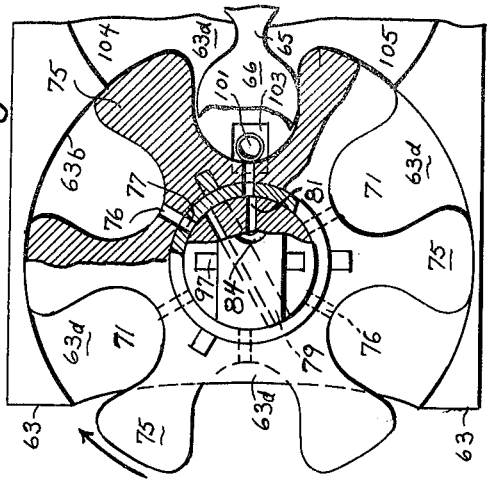
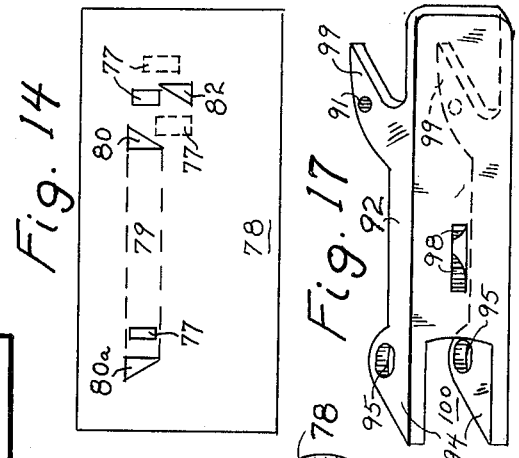
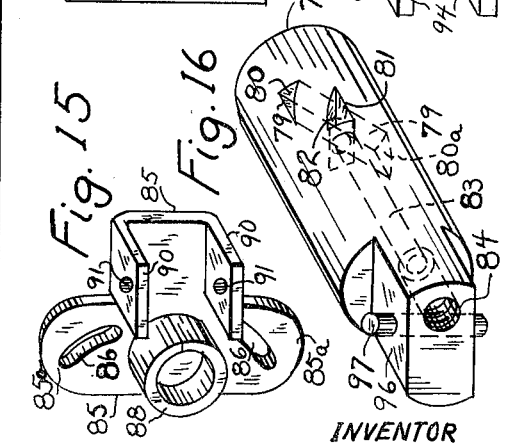
INVENTOR
Charles N. Mosovsky March 1, 1966 C. N. MOSOVSKY 3,237,613
COMBINED TURBO AND INTERNAL-COMBUSTION ENGINE
Filed June 27, 1963 5 Sheets-Sheet 5
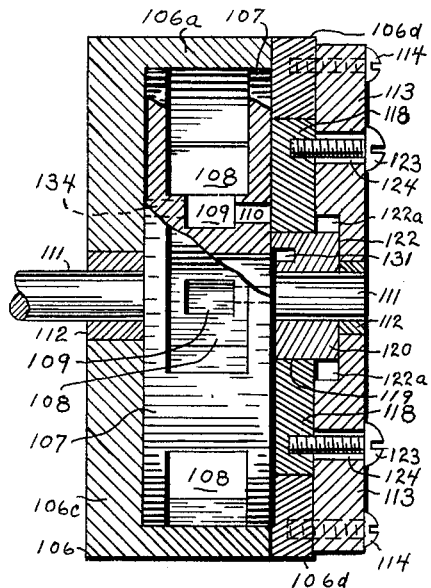
Fig. 19
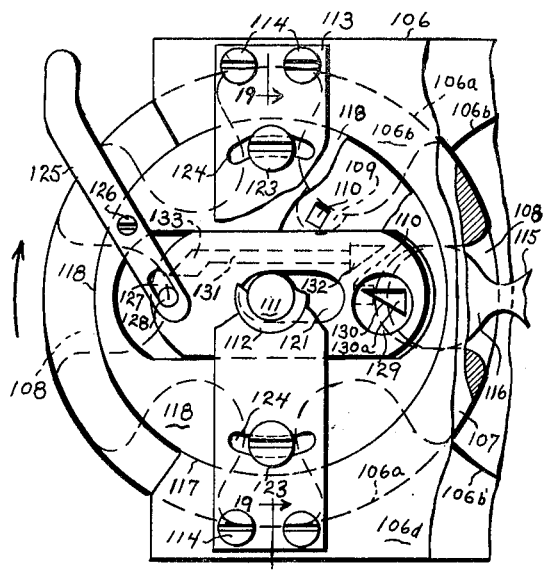
Fig. 18
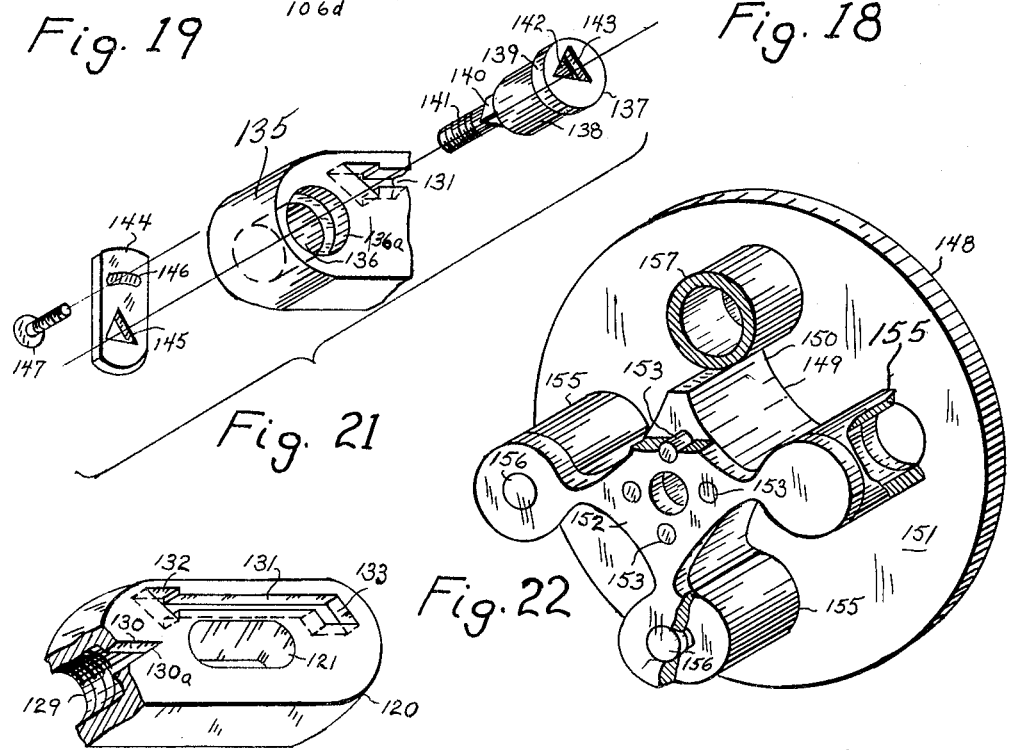
Fig. 21
Fig. 22
Fig. 20
INVENTOR
Charles N. Mosovsky

3,237,613
COMBINED TURBO AND INTERNAL-
COMBUSTION ENGINE
Charles N. Mosovsky, 249 E. 2nd St., New York 9, N.Y.
Filed June 27, 1963, Ser. No. 291,024
4 Claims. (Cl. 123—12)

The invention relates to rotary engines, and more particularly to the rotor element design and configuration in conjunction with means for effecting a proper air and fuel mixture ratio and the utilization and scavenging of burnt exhaust gases.

An application for a similar invention was filed November 2, 1950, Serial No. 193,558, title: Combined Turbo and Internal-Combustion Engine, and which became abandoned for failure to respond to Office-action within the statutory 6-month period, however, in the present application, additional novel improvements have been added.

The rotor elements in this invention function in a like-manner to a pair of rotor elements in a copending application of mine which is for a Fluid Pressure Device, Serial No. 174,929, filed: February 19, 1962, now abandoned. Although as utilized in this invention their novelty is extended so that further functions can be derived from their use.

In this invention, a pair of rotor elements of novel configuration and design are mounted for intermeshing rotation to effect a reciprocating action which can simulate the functions of conventional engines utilizing pistons and rods, crankshaft, timing-means, etc. They are self-synchronizing, that is, they rotate in a gear-like manner, such rotors being symmetrical and of dynamic balance about their rotating axes are capable of high-speed precision rotation.

One of the rotors is of flywheel design having radial recesses which are of suitable depth to serve as compression and combustion chambers. The other rotor is of spoke design, having radial projections whose outer-ends are suitably contoured so that on meshing with the radial recesses of the flywheel rotor cause a fluid-tight, positive-piston displacement means.

Such rotor elements when enclosed in a housing are capable of compounding the contents of the flywheel rotor recesses due to displacement from a second group of recesses which are located between the radial projections of the spoked rotor element, the contents displaced from the second group of recesses are permitted to flow out without being trapped therein and are added to the contents of the flywheel rotor recesses and, a further turbine-like action is effected, whereby the rotor elements divide the housing into two fluid-tight chambers, one of which serves as an air and/or fuel-mixture chamber in which the rotors mesh, the other chamber wherein the rotors unmesh serves as an area where burnt gases, which are released from the flywheel rotor recesses, are retained to exert a turbine-like force on the rotors without any undesirable back pressure effect, before being released from the housing chamber.

Although rotary engines have been invented a long time ago to this date they have not found acceptance in the related industry, yet there is great need for this type of engine.

One of the major drawbacks in the prior art of rotary engines, is the lack of a suitable positive-piston displacement means which could be incorporated into a simple pair of rotor elements to serve as a basic engine around which a fully developed engine can be built.

Most such engines utilize gear-type rotors having conventional teeth which lack enough space between the teeth to serve as suitable compression and combustion-displacement chambers and, rotors which were configured with deep recesses to serve such function, had to use auxiliary gears to synchronize the rotors and even rotors so configured were not positive-piston displacement i the sense of straight-radial-line meshing since rotors which mesh to any great depth must be self-synchronizing because of the ever-changing speed ratio relative to both rotor elements and the linear movement of their synchronizing gears throughout the entire cycle of rotation.

Also lacking in the prior art of rotary engines is a suitable means for maintaining a proper air and fuel mixture ratio, unless auxiliary means are used. Such engines do not have self-suction intake, thereby excluding the use of carburetors for maintaining a proper air/fuel mixture ratio, and as a rule use fuel under pressure or injection means. Air intake is admitted into the engine in fixed parcels trapped between the teeth or in the recesses of the rotors and only the fuel intake is varied so that some provision for by-passing air intake must be considered if the engine is to be used for variable loads, since under idling conditions when fuel intake is reduced a proportional amount of air reduction must accompany it to maintain proper air/fuel mixture ratio, and waste of energy in compressing unneeded air.

There are other conditions where air/fuel ratio varies, for instance, even when proper mixture is admitted it is still subject to change, since after scavenging the recesses of burnt gases, the void is replaced by air which in turn would combine with the mixture, an alternative would be to scavenge with fuel mixture, however, such is inefficient.

A still further undesirable condition resulting in improper air/fuel ratio is that rotary internal-combustion engines of the type utilizing intermeshing rotor elements, in having a volume of air entering in fixed parcels, some of it is rejected at times until periodically pressure builds up sufficiently to pass it between the meshing point of the rotor elements, and although an average passes through, the amount varies from time to time, and since fuel injected is based on average air intake such results in an improper air/fuel mixture ratio during such periods.

Regarding the scavenging of burnt exhaust gases from the rotor elements in the prior art, the method most commonly used is to either expose the rotor elements to the atmosphere, or use auxiliary blowers; the fault of the former is that it is inefficient and the latter costly.

To overcome such drawbacks, a novel improvement in the form of an air by-pass means which serves a dual-purpose is provided in my rotary engine. First, the air by-pass serves to maintain a proper air and fuel mixture ratio by, by-passing unneeded air whenever fuel intake is lessened, or increasing the air supply with increased fuel intake.

The second purpose of the air by-pass is to utilize such by-passed air to scavenge the recesses of burnt exhaust gases at a time when the recesses are exposed from the housing.

It is therefore a first object of this invention to provide a basic engine that would be rotary in principle, but which would have the function means usually found only in conventional piston type engines.

The second object of the invention is to provide such an engine with a pair of rotor elements that are self-synchronizing during rotation and which mesh in a straight-radial-line to effect a positive-piston means of suitable displacement to serve as compression and combustion chambers.

The third object of the invention is to provide an engine with said rotor elements that would have a second displacement means, such rotor elements when enclosed in a housing would serve to compound the air intake and further utilize burnt gases released from the positive-piston displacement chamber as an added turbine-like force before being exhausted.

The fourth object of the invention is to provide a rotary engine with a variable air by-pass means so that proper air and fuel mixture ratio can be maintained whenever the volume of fuel intake is varied.

The fifth object of the invention is to provide a rotary engine with such air by-pass means which can be made movable for the purpose of retarding or advancing the resulting functions.

The sixth object of the invention is to provide a rotary engine with such air by-pass means which would further serve to scavenge the rotor elements of burnt exhaust gases.

The seventh object of the invention is to provide a rotary engine with electrical and/or fuel injection means so as to permit operation as a gas or diesel; such standardized construction would lead to more easily mass-produced cheap and durable engines.

The invention is shown embodied in the different types of engines illustrated in the various figures so that the foregoing and other objects of this invention will become apparent in view of the following description taken in conjunction with the drawings wherein:

FIGURE 1 is a substantially central vertical section of a simple rotary engine, being one example in accordance with the invention, utilizing a spoked rotor having radial projections and a flywheel rotor having rectangular recesses, the side walls of two recesses being broken.

FIG. 2 is a sectional view of the engine taken on the line 2—2 of FIG. 1, the cylindrical-ends of the spoked rotor shown in elevation.

FIG. 3 is a detail perspective view of the air intake and exhaust port for the spoked rotor element and showing one of the cylindrical-ends of the spoked rotor exposed from the opening of the housing.

FIG. 4 is a detail view of the self-synchronizing rotary guide and displacement means, the rotors are shown in the position of, when the segment-lobe of the flywheel rotor is in mesh between the radial projections of the spoked rotor and all cylindrical-ends are unmeshed from the recesses of the flywheel rotor.

FIG. 6 is a front view in elevation of the engine shown in FIG. 1.

FIG. 7 is a front view of a basic engine with modified rotors mounted for open-rotation, the rotors differing in design from the engine of FIG. 1, in that the ends of the radial projections of the spoked rotor are spherical and the flywheel rotor recesses are cylindrical with circular-openings, parts of the engine side wall and of the rotor being broken away.

FIG. 8 is a sectional view taken on the line 8—8 of FIG. 7, the spoked rotor shown in elevation and the core-shaft of the flywheel rotor broken away.

FIG. 9 is substantially an end view of the engine in the direction of line 9—9 of FIG. 7 and partly broken to show the key of the core-shaft.

FIG. 10 is a detail view of the lever which has a slot with a set-screw permitting movement to the left or right and by which the core-shaft can rotate a few degrees one way or the other to effect advance or retard of fuel intake.

FIG. 11 is a view of a more improved modified engine, and the flywheel rotor differing in design from that shown in FIG. 1, in that the recesses have open-sides, the engine side walls serving to close them, the engine being provided with an air and fuel means to maintain a proper mixture ratio, part of the engine wall and of the valve core actuating mechanism broken away.

FIG. 12 is a sectional view of the engine taken on the line 12—12 of FIG. 11, with part of the valve-core broken and the cylindrical-end of the spoke shown in elevation.

FIG. 13 is a fragment view of the engine of FIG. 11, the front side-wall removed, the flywheel rotor and valve-core broken on the line 13—13 of FIG. 12.

FIG. 14 is a developed drawing of the valve-core showing the air by-pass and fuel apertures, and superimposed thereon are the outlet-ducts of the flywheel rotor recesses.

FIG. 15 is a detail perspective view of the swivel-plate and spring holder, and FIG. 16 is a detail perspective view of the valve-core of FIG. 11.

FIG. 17 is a detail perspective view of the throttle-lever of FIG. 11.

FIG. 18 is a fragment view of a modified embodiment of the invention as applied to an alternate air by-pass, fuel supply and scavenging means.

FIG. 19 is a sectional view taken on the line 19—19 of FIG. 18, the flywheel rotor in elevation, but partly broken.

FIG. 20 is a detail perspective view of the valve-bar without the fine-fuel adjustment, the fuel aperture partly broken away.

FIG. 21 is a fragment exploded perspective view of the fine-fuel adjustment means which is located in the valve-bar like that of FIG. 20.

FIG. 22 is a detail perspective view of a modified spoked rotor element showing a composite of an alternate way of fabricating the radial projections.

Figure 5:
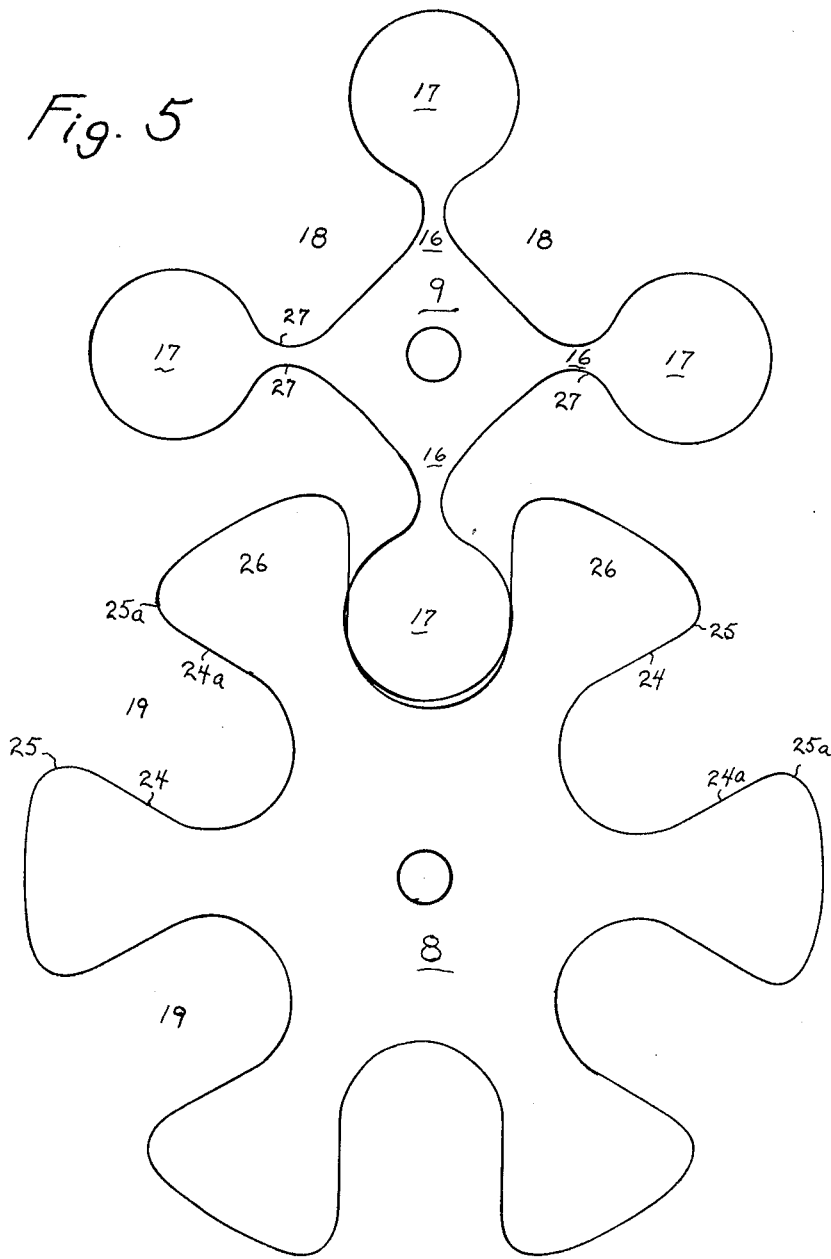
FIG. 5 is a template outline-tracing of an enlarged pair of rotor elements to more clearly show the rotor configuration.

Referring to the embodiment of the invention illustrated in FIGS. 1 to 6 inclusive is essentially a simple engine, the engine housing being generally rectangular and generally indicated at 6 and as here shown comprises top and bottom walls with curved inner surfaces 6a, 6a' and 6b, 6b' and side walls 6c and 6d and end walls with central openings 10 and 11.

The housing 6 is provided with an internally-threaded fuel port 7 to be connected to a suitable conduit, not shown, leading to a pressured fuel supply. Within the housing 6 is a pair of co-acting rotor elements 8 and 9 which partly expose through openings 10 and 11 provided in the end walls of said housing. The rotor element 8 is of flywheel design and is mounted for rotation on shaft 12, which may be a stub shaft or a power take-off shaft, in the space between the peripheral walls 6a, 6a' and partly exposes from said housing through the opening 11, one end of shaft 12 being journaled in the side wall 6c and the other end in a bracket 13 which is secured to the engine side wall 6d by screws 14.

The other said rotor element 9 is of spoke design and mounted for rotation on shaft 15 in the space between the peripheral walls 6b, 6b', said shaft serving as a power take-off. The spoked rotor element 9 comprises circumferentially-spaced radial projections 16 whose outer-ends 17 are cylindrical, the area 18 located between the projections 16 serve as displacement chambers, the purpose of which will become clear later in the specification. The spoked rotor element 9 is in sealing contact with the peripheral walls 6b, 6b' and side walls 6c and 6d, and the flywheel rotor element 8 is in sealing contact with the peripheral walls 6a, 6a' and the side walls 6c and 6d.

The flywheel rotor element 8 has circumferentially-spaced radial recesses 19 which are provided with adjoining combustion chambers 20 and internally-threaded ports 21 to accommodate spark plugs 22 communicating with said combustion chambers. The recesses 19 have flat-parallel side-walls 23, 23a and the walls 24, 24a which separate said recesses are also flat and parallel in their effective piston displacement depth, their leading outer-edges 25, 25a are suitably rounded so that the area disposed between the recesses 19 form a segment-lobe 26 which has a dual-function purpose; first, as a rotor synchronizing means, whereby said segment-lobe 26 meshing between the radial projections 16 of the spoked rotor element 9 co-operates with a suitably contoured portion 27 of the radial projections 16, note FIG. 4, serving to synchronize the meshing of the rotors at a time when no cylindrical-ends 17 are engaged with the recesses 19, such means eliminates the need of synchronizing gears usually associated with rotors configured with the desire to obtain recesses of suitable displacement depth and henceforth said segment-lobe 26 with its associated function will denote the term, self-synchronizing rotary guide means.

The second function of the segment-lobe 26 is to displace the contents of the displacement chambers 18 which are located in the area between the radial projections 16 without trapping the contents therein and thereby serving as a displacement means. When the two functions are stated together the term will read self-synchronizing rotary guide and displacement means.

The rotor elements 8 and 9 are both of symmetrical and dynamic balance about their rotating axes, the shafts 12 and 15 on which said rotors are mounted for rotation have spaced parallel axes to permit intermeshing, the cylindrical-ends 17 of the spoked rotor element 9 mesh within the radial recesses 19 of the flywheel rotor 8 in a straight-radial-line manner to effect a displacement means that is fluid-tight and has a reciprocating action and henceforth will be referred to as a positive-piston displacement to distinguish from a second displacement means of the following whereby the segment-lobe 26 meshes in the recess space 18 to displace the contents without being trapped therein.

The segment-lobes 26 have a width greater than the opening afforded between the cylindrical-ends 17 of the radial projections 16, however, the angle at which they enter and leave co-act with the suitably contoured portion 27 of the radial projections 16 to smoothly pivot therein, one or the other side of the segment-lobe 26 being always in sealing contact with the spoked rotor to form a fluid-tight separation means the purpose of which will be referred to later on.

To more clearly comprehend the configuration of the rotor elements, note FIG. 5, which is an outline-tracing of an actual enlarged pair of rotor elements from which suitable rotation was obtained and which clearly show the deep recesses of both rotor elements and the marked improvement in volume of displacement due to rotors being mounted closely on their rotating axes and having as few spokes in the spoked rotor element as possible all of which is due to the novel self-synchronizing rotary guide means.

The spark-plugs 22 are circumferentially-spaced on the lateral side, about the axis of the flywheel rotor element 8, note FIG. 6, and during rotation pass in close proximity to the electrode 28 which is mounted in their path and at the maximum point of meshing where the cylindrical-ends 17 of the spoked rotor mesh to the maximum depth within the recesses 19 of the flywheel rotor.

The bracket 13 also serves as a means for mounting said electrode 28 and is insulated from said bracket by a rubber grommet 29 and is secured thereto by a washer 30 and nut 31; a threaded portions 28a of said electrode to which a suitable high-tension voltage supply, not shown, is to be attached. The grommet 29 may be set in a ball joint so that the electrode 28 may be set a few degrees one way or the other to effect advance or retard of the ignition function. Also instead of providing spark-plugs 22 for all the ports 21 such ports can communicate with a single, continuously energized ignition means.

The rotor elements 8 and 9 are in sealing contact with each other at their meshing point and in sealing contact with the peripheral walls 6a, 6a', 6b, 6b' and with the side walls 6c, 6d, thereby divide the housing 6 into two fluid-tight compartments or chambers 32 and 33; chamber 32 serving as an intake pressure area and chamber 33 serving as a burnt gas exhaust pressure area. The peripheral walls 6b, 6b' have a length to engage two adjacent radial projections 16 so that at least one of said projections is in sealing contact with each of said walls at all times.

The partial peripheral wall 6a of the housing 6 in which the fuel port 7 is located, has a length to permit the radial recesses 19 of the flywheel rotor 8 to remain covered during the entire time that said fuel port is in communication with said radial recesses the purpose for such will become clear in describing the function of the engine in the following:

The engine as illustrated and described in the foregoing is for gas function and would operate on the principle of a two stroke cycle engine. The rotors divide the housing into two fluid-tight chambers 32 and 33, the flywheel rotor 8 traps air in the radial recesses 19 and the spoked rotor 9 traps air between the radial projections 16 at the time said rotors are exposed from the housing 6 through their respective openings 10 and 11; together, from both rotors, the air is drawn into the housing where it is combined in the intake pressure chamber 32, the segment-lobe 26 meshing between the radial projections 16 serves to synchronize the rotors and displace, without trapping the contents, from therein, thereby pressurizing the chamber 32, the radial recesses 19 communicating with the chamber 32 have such displaced air added to their contents which is in effect a compounding means, fuel being added to the air contents of the recesses 19 during the time said recesses were in communication with the fuel intake port 7; location of the port 7 at that particular position in the peripheral wall 6a being such that although said recesses are already in the housing and covered they are still not in communication with the pressure chamber 32 thereby being under such atmospheric pressure that little if any pressure is required to supply fuel to the port 7; thereafter the cylindrical-ends 17 of the spoked rotor 9 mesh within the radial recesses 19 in a fluid-tight fit that is in effect a true positive-piston displacement, and at maximum meshing depth the contents are confined in the combustion chambers 20 where it is ignited by the spark-plugs 22 which receive high-tension voltage as they rotate past the electrode 28 which is positioned at the maximum meshing point of the rotor elements, after ignition, the unmeshing of the cylindrical-ends 17 from the recesses 19 due to the expanding hot gases which are released into the chamber 33, where the expanding gases further exert pressure on the rotor elements, thereby effecting a turbine-like action, thereafter the burnt gases exhaust from the recesses and from between the radial projections at the time the rotors are exposed from the housing 6. There is no undesirable back pressure effect to contend with because there is no overlapping functions during the cycle of intake, compression and ignition, exhaust. The openings 10 and 11 of the housing 6 serve each as intake and exhaust ports, respectively.

Fuel intake would be varied due to changing load or speed conditions and although such would result at times in an improper mixture due to the air intake remaining constant, satisfactory operation can be obtained but efficiency would be poor.

To function as a diesel engine, all that is required is to disconnect or close-off the fuel supply port 7 and remove the spark-plugs 22, the ports 21 remaining suitably covered and then uncover to communicate with a fuel injection means when the air is suitably compressed to effect ignition. Also, fans secured to either or both shafts may be used to assist in scavenging the rotor elements of burnt exhaust gases.

While the engine described in the foregoing is ideal for many uses, a more basic engine is illustrated, note FIGS. 7 to 10 inclusive, and will be described in the following: The engine has a novel fuel intake means and the rotor elements differ somewhat in design from those in the previously described engine, in that the spoked rotor element has radial projections whose outer-ends are spherical and the flywheel rotor element has radial recesses that are cylindrical with their axes radial to the rotor axis; the purpose of illustrating this form of rotor elements is to show that a great many variations lie between the extremes of cylindrical and spherical-ends and their respective rectangular and cylindrical recesses. However, it will be noted, that the basic outline or silhouette taken centrally across their rotor axes is the same.

The rotors function like those in the previously described engine and referring to the drawings in detail, an engine frame is generally indicated at 35 and as here shown comprises a flanged base 35a with upturned side walls 35b and 35c forming a U-shaped integral unit on which a spoked rotor element 36 and a flywheel rotor element 37 are openly-mounted for intermeshing rotation.

The spoked rotor 36 comprises radial projections 38 having spherical-ends 39 and is mounted on shaft 40 which serves as a power take-off and is secured thereto by a pin 41 passing diametrically through said rotor and shaft, hub-shoulders 42 and 42a of the spoked rotor 36 bearing against the engine side walls 35b and 35c to limit axial truss.

The flywheel rotor 37 comprises circumferentially-spaced recesses 43 that are cylindrical with their axes in a radial-line to the rotor axis, one of their ends opening at the rotor periphery 44 and the inner end 44a at the hub being closed but provided with an outlet-duct 45. The flywheel rotor 37 is mounted on a core-type shaft 46 and is spaced apart parallel to shaft 40. The core-shaft 46 comprises an internally-threaded fuel port 47 to which a pressured fuel conduit, not shown, will be connected, a passageway 48 communicating with the fuel port 47 and emerging radially from said core-shaft periphery at 49 to communicate with the outlet-ducts 45 during rotation of said flywheel rotor.

A means is provided to advance or retard the fuel intake function, whereby the aperture 49 of the passageway 48 communicating with the outlet-ducts 45 can be rotated a few degrees one way or the other and which comprises the core-shaft 46 provided with an integral protruding key 50, a plate-type lever 51, having a keyway 52 into which the key 50 fits, and a slotted-opening 53 which being concentric with said core-shaft axis, is secured to the end of the core-shaft 46 by screws 54, and a set-screw 55 secures said plate-lever to the engine side wall 35b which serves to limit axial movement and permits setting of said core-shaft in the desired position.

The recesses 43 of the flywheel rotor 37 are also provided with adjoining combustion chambers 56 which have passages 57 emerging from the lateral side of said rotor element to communicate with an internally-threaded port 58 located in the engine side wall 35b at the maximum meshing point of said rotor elements, the fuel-port 58 being provided with a spark-plug, not shown, which would be continuously energized when the engine is operated on gas.

The flywheel rotor 37 is in sealing contact with the engine side walls 35b and 35c, the core-shaft 46 being inserted through the opening 59 of the engine side wall 35b, passing freely, but fluid-tight, through the flywheel rotor-hub opening 60, the inserted-end of said core-shaft being journaled, forming a shoulder 61 which bears against and is supported in the housing wall 35c. Function for gas or diesel is as follows:

During rotation of the rotor elements air is trapped in the cylindrical-recesses 43 of the flywheel rotor 37 and the spherical-ends 39 of the spoked rotor 36 mesh within said cylindrical-recesses. A segment-lobe 62, disposed between said recesses, serves to synchronize said rotors between the time said spherical-ends are unmeshed from said recesses, and at some interval, either at the start of or at maximum compression, fuel under pressure is admitted into the combustion chamber 56 and at maximum compression the passage 57 communicates with said combustion chamber and the spark-plug port 58 to ignite the mixture. Thereafter during unmeshing due to combustion, the burnt hot-gases are exhausted into the atmosphere from the recesses. For diesel operation, the electrical ignition can be dispensed with.

The simple engine and the basic engine described in detail in the foregoing are each a complete engine in their class. However they are limited to the functions that their particular design allows and more useful and efficient operation can be obtained from said rotor elements with the addition of a further improvement. Such improvement is in the form of a novel air by-pass aperture, the object of which being a means to maintain a proper air and fuel mixture ratio. Its function is to make a corresponding change in the volume of air intake whenever fuel intake is varied. The air by-pass aperture also serves a further function in that, unneeded by-passed air is further utilized to scavenge the recesses of burnt exhaust gases.

The engines to be described hereinafter pertain mainly with the several ways of providing the engines described in the foregoing with the stated means to maintain a proper air/fuel mixture ratio and the scavenging means, so that only such matter will be elaborated on, the remaining functions of the engines being similar would require a general explanation and only that which departs from previously stated matter will be described in detail.

Referring to embodiments of the invention illustrated in FIGS. 11 to 21 inclusive, and first to FIGS. 11 through 17, the engine shown comprises singly or in combination the structure of the previously described engines in conjunction with the stated air/fuel proportioning means and the scavenging means.

Referring more in detail to the figures of the drawings, an engine housing is generally indicated at 63 having peripheral walls 63a, 63a', 63b, 63b' and side walls 63c and 63d, a spoked rotor element 64 having radial projections 65 with cylindrical outer-ends 66 being mounted for rotation on a power take-off shaft 67 secured thereto by a key 68 and journaled in bushings 69 which are supported in the side walls 63c and 63d; the spoked rotor 64 being in sealing contact with the peripheral walls 63a, 63a' and the side walls 63c and 63d.

A flywheel rotor element 70 comprising open-sided radial recesses 71 having adjoining combustion chambers 72 is secured to a rotatable splined-sleeve 73 whose ends are journaled in bushings 74 which are supported in the engine side walls 63c and 63d; the flywheel rotor 70 being in sealing contact with the peripheral walls 63b, 63b' and with the side walls 63c and 63d thereby serving to close the open-sides of the recesses 71. The rotors have parallel axes suitably spaced apart for intermeshing rotation, a segment-lobe 75 being disposed between the radial recesses 71 serving as a synchronizing means during the interval when the cylindrical-ends 66 are out of mesh with the recesses 71. The flywheel rotor 70 is provided with angularly-spaced radial outlet-ducts 76 leading inwardly from the combustion chambers 72 and which communicate with a similar set of radial ducts 77 in the splined-sleeve 73.

A shiftable valve-core 78 which is also rotatable is slidably mounted freely, but fluid-tight, within the splined-sleeve 73. The valve-core 78 is provided with an air by-pass aperture 79 which passes diametrically through said valve-core, its orifice 80 and 80a at the periphery being triangular, and although the entire aperture is shown triangular, only the orifice 80 need be triangular and which will become clear in the continuing description.

The valve-core 78 is also provided with a fuel supply aperture 81 spaced angularly as well as slightly axially relative to the orifice 80, its orifice 82 being also triangular but inverted laterally from the orifice 80, the inner end being closed but communicates via passageway 83 with an internally-threaded fuel port 84. The radial ducts 77 in the splined-sleeve communicate with all said orifices during rotation of the rotors in a manner depending on the relative position of the valve-core and will be thoroughly described in detail later on.

Movement of the valve-core 78 is controlled by means of a mechanical assembly, note FIGS. 11 and 12, comprising a U-shaped swivel-plate 85 having integral flanges 85a which are provided with elongated slots 86 which are concentric with said valve-core axis, set screws 87 securing the swivel-plate 85 to the engine side wall 63c. A collar 88 which may be integral or welded onto said swivel-plate serves a a receptacle into which a spring 89 is fitted, and two integral upturned sides 90 which are provided with pinholes 91 serve as a hinge on which a throttle-lever 92 is secured by pin 93. The end of the throttle-lever 92 is bifurcated forming flange-like tines 94 having pin holes 95 serving as a yoke that fits onto the flat-sided protruding end 96 of the valve-core 78 and is movably secured thereto by a pin 97 which is secured tightly or by some other means in the valve-core end 96. Tines 98 of the throttle-lever 92 punched inwardly serve to align and secure the free end of the spring 89 which bears outwardly against the throttle-lever 92 and rockers 99 being integral therewith limit outward movement thereby serving to hold the valve-core in maximum outward position. The entire mechanical assembly as a unit has a concentric movement.

An opening 100, note FIG. 17, is provided to afford access to the fuel port 84 to which a fuel line, not shown, will be connected.

The side wall 63d is provided with an internally-threaded port 101 which is adapted with a spark-plug 102, and a combustion chamber 103 which communicates with the port 101 and with the combustion chambers 72 of the flywheel rotor recesses 71 during rotation.

Movement of the throttle-lever so that the valve-core slides in or out of the splined-sleeve regulates the air/fuel proportioning means, and concentric-movement of the swivel-plate, which moves as a unit the entire assembly, advancing or retarding the function are described in detail in the following:

The rotor elements, being in sealing contact at their meshing point and with the peripheral and side walls, divide the housing into two fluid-tight chambers. The spoked rotor and the flywheel rotor trap air in their recesses during the interval when both are partly exposed from the housing 63 and together, as indicated by the arrows, carry it into the intake chamber 104 wherein the segmelt-lobe 75 meshing between the radial projections 65 displaces the air content from therein and thereby pressurizing said intake chamber, the displaced air being added to the air already in the recesses 71 resulting in a compounding effect, and the full volume of air may be needed under full load conditions where sufficient fuel is admitted into the recesses to form a proper air/fuel mixture ratio. However, wherever load or speed conditions change and less fuel is needed the air intake being constant would result in an improper air/fuel ratio and it is for this purpose that an air by-pass aperture 79 is provided.

Excess air to be expelled from the recesses is released via the radial outlet-ducts 76 and 77 which are in communication with the orifice 80 of the air by-pass aperture 79, such released air passing through the aperture 79 and out from the orifice 80a which is simultaneously in communication with the radial outlet-ducts 76 and 77, diametrically opposite, whose recesses 71 at that interval being exposed from the housing 63, thereby serving to scavenge said recesses of burnt exhaust gases. At this point it will be noted that the air by-pass aperture 79 may be bored round and its orifice 80a may be some other configuration than that shown and preferably flared so as to remain longer in communication with said outlet-ducts of the recesses 71 which are to be scavenged, and only the orifice 80 need be triangular and so oriented.

The valve-core 78 is movable along its longitudinal axis, and as shown in FIG. 12, with said valve-core in the most outward position and with rotation of the rotors as indicated by the arrows, the radial outlet-ducts of the recesses 71 communicate in sequence first, with the orifice 80 of the air by-pass aperture 79 in such manner that they co-act with the wide end of the triangular-opening, thereby, by-passing a substantial part of the air intake, and thereafter said radial outlet-ducts communicate with the apex part of the triangular-opening of the orifice 82 of the fuel supply aperture 81 thereby permitting only a small amount of fuel to sustain running.

However, moving the valve-core 78 inward restricts the amount of air that will be by-passed and increases the fuel intake, since the orifices 80 and 82 have triangular-openings that are inverted laterally and so positioned that inverse size openings are presented to the radial outlet-ducts 77 which now co-act with the apex part of the orifice 80 of the air by-pass aperture 79 and with the wide end of the triangular orifice 82 of the fuel aperture 81.

To further comprehend the function, note FIG. 14, here in the developed drawing of the valve-core 78, the relative positions of the air by-pass orifices 80 and 80a, and the fuel orifice 82 which are fixed, and superimposed are the outlet-ducts 77 relative thereto, the valve-core 78 being in the position shown in FIGS. 12 and 13, and the outlet-ducts 77 being shown in broken lines to indictate other possible relative positions with the valve-core being moved in or out of the sleeve 73 to effect air/fuel mixture ratio or rotated to effect advance or retard of the function.

The remaining function is like that of the previously described engines, except for the manner in which the combustion chambers 72 of the flywheel rotor recesses 71 communicate with the combustion chamber 103. In this version the ignition takes place in the combustion chamber 103 which is provided with a spark-plug 102 and is continuously energized when the engine is operated by gas. However, for diesel operation self-ignition would suffice, thereafter hot gases being released into the exhaust pressure chamber 105 to exert a turbine-like force on the rotors before being released and the recesses being scavenged due to the outlet-ducts 77 communicating with the air by-pass orifice 80a at the time the recesses 71 are exposed from the housing 63.

A second example of that type engine which is provided with a means for maintaining a proper air/fuel mixture ratio and scavenging means is illustrated in the drawings of FIGS. 18 through 21, having an alternative arrangement of the air by-pass, fuel supply and scavenging means, being modified to co-act with the lateral side of the flywheel rotor of an engine essentially like that described and illustrated in the drawings of FIGS. 1 through 6, except that the spark-plugs and ignition means have been removed and instead comprise the means as stated (see column 9, lines 24–29) and only new matter will be described in detail.

Referring to the drawings in detail, note FIGS. 18 and 19, an engine housing is generally indicated by 106, having partial peripheral walls 106a, 106a', 106b, 106b', and side walls 106c and 106d which may be secured together in any suitable manner. A flywheel rotor element 107, comprising circumferentially-spaced radial recesses 108 having adjoining combustion chambers 109 which are provided with lateral outlet-ducts 110, is mounted for rotation in the space between the peripheral walls 106a, 106a' and side walls 106c and 106d which are in sealing contact therewith, and is secured to a rotatable power take-off shaft 111, journaled in a bushing 112 supported in the engine side wall 106c and in bracket 113 which is secured to the engine side wall 106d by screws 114.

A spoked rotor element, not shown, including circumferentially-spaced radial projections 115 with cylindrical outer-ends 116, is mounted for intermeshing rotation on a spaced parallel shaft, not shown, to the axis of the flywheel rotor 107 in the space between the peripheral walls 106b, 106b' and side walls 106c and 106d and is in sealing contact therewith.

The engine side wall 106d is provided with a circular opening 117 concentric with the axis of shaft 111, into which is fitted a rotatable disc 118 having an elongated central opening 119, a shiftable valve-bar 120 being slidably mounted freely, but fluid-tight, within the opening 119 and is in sealing contact with the lateral side of the flywheel rotor 107. The valve-bar 120 is provided with a central slot 121 to permit lateral movement and through which shaft 111 passes, being retained in position by the bracket 113 which has a recess 122 with clearance spaces 122a to accommodate said valve-bar, the clearance spaces allowing a few degrees of rotation either way from horizontal position when the disc 118 is rotated. The disc 118 is secured to the bracket 113 by set screws 123 that pass through slots 124 which are concentric with the flywheel rotor axis to permit the disc 118 to rotate some degrees in either direction. Movement of the valve-bar 120 is controlled by the throttle-lever 125, which is freely secured to the rotatable disc 118 by a screw 126, and is provided with a radius-slot 127 which co-operates with a pin 128 secured tightly in said valve-bar.

The valve-bar 120, note FIG. 20, is provided with an internally-threaded fuel port 129 to which a pressured fuel-line, not shown, is to be connected.

The fuel port 129 of the valve-bar 120 communicates with an aperture 130 having a triangular orifice 130a which emerges on the side which co-operates with the flywheel rotor and which side is also provided with a grooved passageway 131 which, when the valve-bar 120 is in sealing contact with the lateral side of the flywheel rotor 107 serves as an air by-pass aperture and henceforth will be so designated. The inlet-end of the air by-pass aperture 131 has a triangular orifice 132, the outlet-end having an angular disposed orifice 133 the purpose of which will become clear in relating of the function in the following:

The function is like that of the previously described engine, excess air to be by-passed being directly related to the position of the valve-bar 120 and as shown in FIG. 19, with said valve-bar to the right, the outlet-ducts 110 being directly in the path to communicate fully with the entire triangular orifice 132 thereby by-passing most of the air from the recesses 108. Thereafter the outlet-ducts 110 communicate with only the apex part of the triangular fuel-orifice 130a which restricts the flow of fuel. Excess air is released via the air by-pass aperture 131 from the outlet-orifice 133 which communicates with the outlet-ducts 110 of the recesses that are exposed from the housing, scavenging being delayed a few degrees since the orifice 132 is not diametrically opposite. However, pressure would build up in the air by-pass aperture 131 meanwhile, giving the recesses 108 a chance to scavenge themselves and then a burst of air would clear the residue. Shifting the valve-bar 120 in the extreme other direction results in the outlet-ducts 110 communicating with the apex part of the air by-pass orifice 132 and fully with the fuel-orifice 130a thereby reversing the function, and rotating the valve-bar 120 in either direction by resetting of the set screws 123 in the slots 124 rotates the disc 118, would advance or retard the function.

The intake capacity of the rotor elements is sufficient so that when a full volume of air is needed for a proper fuel mixture ratio, there would still be a reserve of air for the scavenging function. The engine is only illustrated for diesel operation, however, it will also operate on gas. An electrical ignition means can be provided as stated previously (see column 10, lines 49–51), and FIG. 19, wherein the combustion chambers 109 would be provided with flash passages 134, shown in broken lines.

A modified valve-bar 135, to be used as an alternate to the valve-bar 120, is provided with a further novel improvement in the form of a means to effect a fine fuel adjustment, only a fragment of the valve-bar 135 being illustrated which contains the improvement, and as here shown, note FIG. 21, comprises essentially the valve-bar 135 provided with a bored opening 136 having a concentric countersunk recess 136a into which is rotatably fitted a fuel-core 137, and is provided with an air by-pass aperture 131 like that of the valve-bar 120. The fuel-core 137 is an integral unit comprising a cylindrical body 138 having at one end a collar 139, concentric therewith, and on its other end, eccentric therewith, a three-sided lobe 140 with an extending, externally-threaded, nipple 141; a passageway 142 concentric with said nipple and lobe but eccentric with said cylindrical body and collar, emerges from the lateral side of the collar 139 in a triangular orifice 143 eccentric therewith. A lever 144 provided with a triangular opening 145 to accommodate the three-sided lobe 140, and a slot 146 concentric with said lobe, allows some degree of rotation, and repositioning said lever on said lobe would greatly extend the rotation of the fuel-core 137 which otherwise is limited by the length of the slot 146. The lever 144 is secured to the valve-bar 135 by a setscrew 147 passing through the slot 146, and the fuel-core 137 is retained in position by bearing against the lateral side of the rotor 107 and is in sealing contact therewith. A flexible fuel-line and a suitable fitting that would give some degree of rotation, not shown, to be coupled to the threaded-nipple 141 would lead to a suitable pressured fuel supply. The purpose and function are as follows:

It would take considerable calculation to determine the exact relative positions of the orifices, especially so when the engine is idling, fuel mixture ratio becomes very critical, here, by rotating the cylindrical-body 138, the orifice 143 being eccentric therewith, alters the relative distance between the orifices, and the sides of the triangle of the rotatable orifice 143 may be made of unequal lengths thereby giving a large variety of settings and orientations.

In the various engines illustrated, the spoked rotor is shown throughout as a solid integral unit. However there are many ways that the rotor can be fabricated, as an example, note FIG. 22, wherein the rotor shown is a composite, in that the hub-body and radial projections are integral and the outer cylindrical-ends are secured separately and are not all alike.

Referring to the drawing in detail, the rotor is generally indicated by 148 having a hub-body 149 with integral radial projections 150. An end disc 151 and a lamina 152, configured along the novel outline of the other spoked rotors, are secured by rivets 153 to the lateral sides of the rotor and a centrally bored shaft opening is provided. The cylindrical-ends 155 are solid rollers and are secured by rivets 156 which rollers may be fixed or rotatable to have rolling contact with the flywheel rotor, to thereby provide a friction-free contact and wear-free since the point of contact would always change; the other cylindrical-ends 157 being hollow sleeves which may be welded in position. The rotor may have two end discs 151 and in open rotation the end discs would serve to enclose the open-sided recesses of the flywheel rotor, and when enclosed in a housing the engine side walls would be recessed to accommodate the end discs 151.

In considering the novel merits of the self-synchronizing rotary guide, the function pertaining to ignition timing, and torque, should be examined separately, since it presents a new concept in view of the following:

The engine shown in FIG. 19, has the power take-off shaft secured to the flywheel rotor, and the other engines may also be so provided. In practice such would be ideal wherever practical for the reason that the flywheel rotor has more weight to store energy, its momentum providing a more steady rotation, which is important because of the constant variation of speed relative to both rotors throughout each cycle of rotation; the spoked rotor being lighter would more readily respond to variation, and in effect would serve as a companion-idler.

It is this contant variation of speed that serves a useful function in ignition timing or fuel injection timing. The cylindrical-ends of the spoked rotor are driven by the radial recesses of the flywheel rotor at the shortest radii at the time they are at their maximum meshing depth, thereby the cylindrical-ends approach that point and receed therefrom at the lowest speed allowing the longest time period at the critical ignition timing phase, as against the period when the cylindrical-ends are pivoting at the outer-end of the segment-lobe, there the spoked rotor makes its greatest angular movement, relative to the flywheel rotor and thereby makes a marked improvement in the function of timing over rotors which mesh along the periphery or are linear in their movement when synchronizing gears are used. Torque is also improved at all speeds because of the expanding gases remaining in the positive-piston displacement means a greater length of time to exert force instead of being released quickly when they still contain a lot of energy.

As an example of difficult timing and release of energy too soon, and to which an analogy can be drawn, is a piston engine utilizing crankshaft and connecting-rods, here the piston approaches top dead center and receeds therefrom at maximum speed, which is the greatest speed of the entire cycle and just at the critical timing phase, whereas the piston moves at its slowest speed in the vicinity of its maximum descent. This is so because the piston moves only half as far in its first quarter cycle than in the second quarter and when descending moves twice as far in the third quarter than in the last quarter cycle.

This was not an observation by chance, but a deliberate study which led to the present rotor design and had its origin many years ago; to overcome such timing disadvantages I had submitted to the National Inventors Council back in 1942, a compounded-turbine engine, although such utilized pistons and crankshaft the principle of function was there.

No exact relative dimensions of the mechanical parts and capacities of the chambers and ducts have been shown, it being obvious that the drawings are illustrative of the invention and various changes in construction and design of the respective parts can be made without departing from the spirit or scope of the invention as defined by the appended claims.

What I claim is:

1. In a combustion engine, a rectangular shaped housing, having spaced side walls, top and bottom walls joining said side walls, said top and bottom walls having curved inner surfaces, end walls having central openings therein, a first rotor element rotatably mounted in the housing between said side walls, at one end thereof, the spaces between the spokes constituting non-trapping displacement chambers, a fly-wheel rotor element rotatably mounted in the housing between the side walls at the other end thereof in line with said first rotor element, said flywheel rotor element having a solid body formed with peripheral recesses forming lobes, the spaces between the lobes constituting positive-piston displacement chambers, said chambers having means for admitting a mixture of fuel and air and adapted to receive the spokes of said first rotor element, said lobes and spokes adapted to mesh upon rotation of the elements, and to project outwardly of the central openings in the end walls upon rotation, said meshing lobes and spokes adapted to serve as synchronizing means and to serve as a displacement means for said non-trapping displacement chambers, and means for firing the mixtures in the displacement chambers, said rotor elements having a fluid tight fit at their meshing points and contacting the curved walls upon rotation thereby dividing the interior of the housing into two fluid tight compartments, one of said compartments wherein said lobes mesh with said non-trapping chambers serving to compound said positive piston recesses, the other compartment serving as a burnt gas expansion compartment.

2. In a combustion engine, a rectangular-shaped housing having spaced side walls, top and bottom walls joining the side walls, said top and bottom walls having curved inner surfaces, end walls having central openings therein, a spoked rotor element rotatably mounted in the housing between the side walls at one end, said spoked rotor element having a solid body with spaced spokes radiating from the periphery thereof, the spaces between the spokes constituting non-trapping displacement chambers, integral cylindrical members constituting the ends of the spokes, the peripheries of said end cylinders adapted to contact the inner surfaces of the top and bottom walls, said side walls having opposed openings at one end thereof, a sleeve disposed across the space between the side walls with its ends secured in said opposed openings, a cylinder slidable in said sleeve, means for sliding said cylinder, a flywheel rotor element rotatably mounted on said sleeve between the side walls, in alignment with the spoked rotor element, said flywheel rotor element having a cylindrical solid body with a central opening and with spaced recesses in the periphery thereof adapted to receive the end cylinders of the spokes of the spoked rotor element, said cylinder having a closed passage constituting an inlet, said closed passage adapted to be connected to a source of supply of gas under pressure, said cylinder having a transverse passage therein communicating with the inner end of the closed passage and constituting an outlet, the body of said flywheel rotor element having radial passages leading from the outlet in the cylinder to the peripheral recesses in the flywheel rotor element, valve means controlling the passage of gas through said closed passages in the cylinder, and means carried by the side wall and communicating with the peripheral recesses in the flywheel rotor element for firing the mixture of gas and air.

3. In a combustion engine, a rectangular shaped housing having spaced side walls, top and bottom walls joining the side walls, said top and bottom walls having curved inner surfaces, and walls having central openings therein, a spoked rotor element rotatably mounted in the housing between said side walls at one end, said spoked element having a solid body with spaced spokes radiating from the periphery thereof, the spaces between the spokes constituting non-trapping displacement chambers, a flywheel rotor element rotatably mounted in the housing between the side walls at the other end thereof in line with said spoked rotor element, said flywheel rotor element having a solid body formed with peripheral recesses forming lobes, the spaces between the lobes constituting positive-piston displacement chambers, said rotor elements having air intake means and fuel intake means, ignition means and burnt gas exhaust means, said air and fuel intake means being provided with a means to maintain a proper air and fuel mixture ratio, said means to maintain a proper air and fuel mixture ratio comprising the flywheel rotor element recesses, said recesses having outlet-ducts communicating first with an air by-pass apertur and thereafter with a fuel supply aperture, said air by-pass aperture and said fuel supply aperture being unitarily variable to effect inversely proportional openings relative to said outlet-ducts, said flywheel element outlet-ducts communicating with said air by-pass aperture when said recesses are exposed to effect scavenging of burnt-gases from said recesses.

4. In a combustion engine, a rectangular shaped housing having spaced side walls, top and bottom walls joining the side walls, said top and bottom walls having curved inner surfaces, end walls having central openings therein, a spoked rotor element rotatably mounted in the housing between the side walls at one end, said spoked rotor element having a solid body with spaced spokes radiating from the periphery thereof, integral cylindrical members constituting the ends of the spokes, the spaces between the spokes constituting non-trapping displacement chambers, the peripheries of said end cylinders adapted to contact the inner surfaces of the top and bottom walls, said side walls having opposed openings at one end thereof, a sleeve disposed across the space between the side walls with its ends secured in said opposed openings, a flywheel rotor element having a central opening rotatably mounted on said sleeve between the side walls, in alignment with the spoked rotor element, said flywheel rotor element having peripherally spaced recesses adapted to receive the end cylinders of the spokes of said spoked rotor element, said rotor recesses having outlets ducts, a valve-core axially slidable in said sleeve, to effect an air and fuel proportioning means, said valve-core being rotatable to effect timing of said air and fuel proportioning means, said valve-core having a substantially diametrically disposed air by-pass aperture and a radially disposed fuel aperture communicating axially with a fuel port, said air by-pass and fuel apertures each having a triangular orifice disposed apart axially and radially relative to each other, said triangular orifices being oriented with their apex parts opposing, said flywheel rotor element outlet ducts during rotation communicating in sequence first with said air by-pass orifice and subsequently with said fuel orifice, axial movement of said valve-core effecting inversely proportional openings, one of said side walls having a combustion chamber, a spark plug in said combustion chamber communicating with said rotor recesses at maximum meshing point and high voltage ignition means in said housing.

References Cited by the Examiner

UNITED STATES PATENTS

| | | | |
|---|---|---|---|
| 3,105,473 | 10/1963 | Johns et al. | 123—8 |
| 3,115,124 | 12/1963 | Huthmacher | 123—12 |

FOREIGN PATENTS

| | | |
|---|---|---|
| 979,103 | 12/1950 | France. |
| 19,447 | 10/1882 | Germany. |
| 231,015 | 3/1909 | Germany. |
| 679,397 | 8/1939 | Germany. |
| 354,882 | 8/1931 | Great Britain. |
| 525,371 | 5/1955 | Italy. |

SAMUEL LEVINE, *Primary Examiner.*

KARL J. ALBRECHT, DONLEY J. STOCKING,
*Examiners.*

R. M. VARGO, *Assistant Examiner.*